United States Patent
Lee (10) Patent No.: US 11,601,201 B2
(45) Date of Patent: Mar. 7, 2023

(54) OPTICAL TRANSCEIVER BASED ON PLANAR LIGHTWAVE CIRCUIT

(71) Applicant: ELECTRONICS AND TELECOMMUNICATIONS RESEARCH INSTITUTE, Daejeon (KR)

(72) Inventor: Jyung Chan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/507,741

(22) Filed: Oct. 21, 2021

(65) Prior Publication Data
US 2022/0247494 A1    Aug. 4, 2022

(30) Foreign Application Priority Data
Feb. 4, 2021    (KR) .......................... 10-2021-0016056

(51) Int. Cl.
*H04B 10/00* (2013.01)
*H04B 10/43* (2013.01)
*G02B 6/12* (2006.01)
*H04J 14/00* (2006.01)

(52) U.S. Cl.
CPC ......... *H04B 10/43* (2013.01); *G02B 6/12011* (2013.01)

(58) Field of Classification Search
CPC ............................... H04B 10/40; H04B 10/43
See application file for complete search history.

(56) References Cited

U.S. PATENT DOCUMENTS

| | | | |
|---|---|---|---|
| 8,049,159 B2 | 11/2011 | Shinoda et al. | |
| 8,104,977 B2 | 1/2012 | Sone et al. | |
| 8,540,437 B2 | 9/2013 | Lee et al. | |
| 8,926,198 B2 | 1/2015 | Park et al. | |
| 2009/0232452 A1 | 9/2009 | Ozeki et al. | |
| 2010/0183268 A1 | 7/2010 | Kihara et al. | |
| 2011/0249936 A1* | 10/2011 | Welch ................. | H04J 14/0258 427/8 |
| 2014/0099055 A1 | 4/2014 | Chen et al. | |

FOREIGN PATENT DOCUMENTS

| | | | |
|---|---|---|---|
| KR | 10-2009-0064952 A1 | 6/2009 | |
| WO | 2014/190900 A1 | 12/2014 | |

OTHER PUBLICATIONS

Product Description Page: 25G SFP28 Optical Transceiver UTOPTEK (HongKong UTOP Technology Co., LTD.).
Product Description Page: 25G BIDI SFP28, EOPTOLINK Technology Inc., Ltd.
"Optical transceivers market to more than double to $17.7bn by 2025, driven by investment in data centers", http://www.semiconductor-today.com/news_items/2020/jun/yole-120620.shtml (News Page).

* cited by examiner

*Primary Examiner* — Daniel G Dobson
(74) *Attorney, Agent, or Firm* — LRK Patent Law Firm (57) ABSTRACT

An optical transceiver may include an optical receptacle configured to input or output an optical signal, a first planar lightwave circuit through which the optical signal travels, an arrayed waveguide grating connected to the first planar lightwave circuit, and a first spot size converter connecting the optical receptacle and the first planar lightwave circuit.

17 Claims, 6 Drawing Sheets

FIG. 7

OPTICAL TRANSCEIVER BASED ON PLANAR LIGHTWAVE CIRCUIT

CROSS-REFERENCE TO RELATED APPLICATION

This application claims the benefit of Korean Patent Application No. 10-2021-0016056 filed on Feb. 4, 2021, in the Korean Intellectual Property Office, the entire disclosure of which is incorporated herein by reference for all purposes.

BACKGROUND

1. Field of the Invention

One or more example embodiments relate to a planar lightwave circuit-based optical transceiver and optical transceiver module.

2. Description of Related Art

The importance of an optical transceiver to transmit and receive an optical signal has increased due to widespread use of Long-Term Evolution (LTE) service and personal mobile phones with 5G service, an expansion of fiber to the home and a high-speed transmission net for various realistic multimedia services, and due to the importance of high capacity data storage and backup devices.

An optical module or an optical interface of an optical transceiver is divided into a duplex type having a separate optical transmitter and an optical receiver and a bi-directional (BIDI) type (or simplex type) having a combined optical transmitter and an optical receiver.

In the duplex type, an optical transmission wavelength is determined by a standard, however, an optical receiving wavelength is intended to receive a wide range of wavelength. Thus, an optical transmission interface and an optical receiving interface are separated by separate ports.

Most data centers or optical transport networks are using the duplex type. The duplex type includes a transmit optical sub-assembly (TOSA) and a receive optical sub-assembly (ROSA). The TOSA and ROSA are separately mounted and used on the optical transceiver.

In the BIDI type (or simplex type), the optical transmission wavelength is determined by a standard, and the optical receiving wavelength is determined by the same standard. Thus, the optical transmission interface and the optical receiving interface have a same port including a function element to separate-combine an optical transmission wavelength and an optical receiving wavelength. The BIDI type (or simplex type) is used in most mobile networks and includes a bi-directional optical sub-assembly (BIDI OSA). The BIDI OSA is mounted and used on an optical transceiver.

SUMMARY

Example embodiments provide a technology related an optical transceiver based on a planar lightwave circuit.

However, the technical aspects are not limited to the aforementioned aspects, and other technical aspects may be present.

According to an aspect, there is provided an optical transceiver including an optical receptacle configured to input or output an optical signal, a first planar lightwave circuit through which the optical signal travels, an arrayed waveguide grating connected to the first planar lightwave circuit, and a first spot size converter connecting the optical receptacle and the first planar lightwave circuit.

The first planar lightwave circuit, the arrayed waveguide grating and the first spot size converter may be formed on a single chip.

The optical transceiver may further include a mirror configured to change a path of an optical output of the arrayed waveguide grating.

The mirror may be a 45-degree mirror.

The optical transceiver may further include a second planar lightwave circuit connected to the arrayed waveguide grating.

The optical transceiver may further include a second spot size converter connected to the second planar lightwave circuit.

The optical transceiver may further include a laser diode connected to the second spot size converter, and a laser diode driver.

The laser diode driver is connected to a high-speed signal pad by a high-speed signal line.

The optical transceiver may further include a first mount placed under the laser diode and the laser diode driver.

The first mount may be formed of silicon dioxide and silicon nitride.

The laser diode and the laser diode driver may be connected by a high-speed signal line.

The optical transceiver may further include a third planar lightwave circuit connected to the arrayed waveguide grating.

The optical transceiver may further include a photodiode connected to the third planar lightwave circuit, and a transimpedance amplifier (TIA) connected to the photodiode.

The optical transceiver may further include a third spot size converter connecting the third planar lightwave circuit and the photodiode.

The photodiode and the TIA may be connected by a high-speed signal line.

The optical transceiver may further include a second mount placed under the first planar lightwave circuit, the arrayed waveguide grating and the first spot size converter.

The optical transceiver may further include a third mount placed under the second mount, wherein a high-speed signal line formed of titanium (Ti), platinum (Pt), and gold (Au) is formed on a portion of the third mount.

A high-speed signal pad including gold-tin (AuSn) may be formed on a portion of the third mount.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 1:
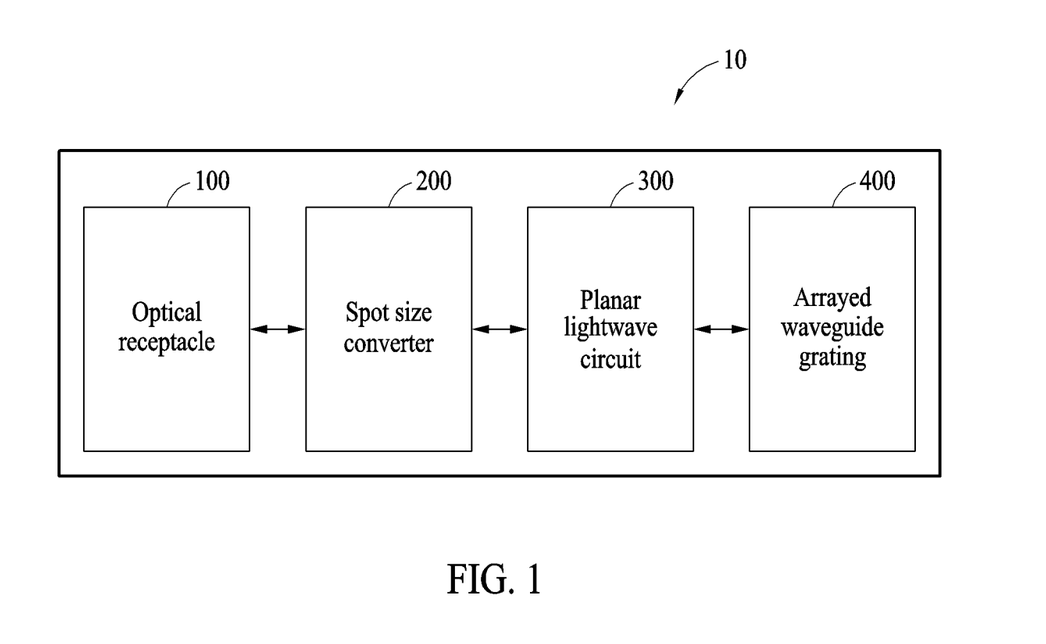
FIG. 1 is a block diagram illustrating an optical transceiver according to an example embodiment.

FIG. 1 is a block diagram illustrating an optical transceiver according to an example embodiment.

Referring to FIG. 1, an optical transceiver 10 may transmit or receive an optical signal. The optical transceiver 10 may perform optical transmission and optical reception functions by converting an electrical signal to an optical signal and transmitting the optical signal through an optical fiber as a medium and receiving the transmitted optical signal and converting the transmitted optical signal back to the electrical signal.

The optical transceiver 10 may include an optical receptacle 100, a spot size converter 200, a planar lightwave circuit 300 and an arrayed waveguide grating 400.

The optical transceiver 10 may include a bidirectional optical sub assembly. The optical transceiver 10 may achieve high-speed of the bidirectional optical sub assembly by linearizing an optical transmitter axis and an optical receiver axis and linearizing a high-speed electrical signal axis. The optical transceiver 10 may achieve high-density using the planar lightwave circuit 300. The optical transceiver 10 may perform high-density bidirectional optical transmission and reception using the planar lightwave circuit 300 and the arrayed waveguide grating 400.

The optical transceiver 10 may enhance a coupling efficiency between the planar lightwave circuit 300 and the optical receptacle 100 and an optical coupling efficiency between a bulk optic filter and a photodiode using the spot size converter 200.

The optical receptacle 100 may input or output an optical signal. The planar lightwave circuit 300 may allow an optical signal received from the optical receptacle 100 to travel through. The spot size converter 200 may connect the optical receptacle 100 and the planar lightwave circuit 300. The arrayed waveguide grating 400 may be connected to the planar lightwave circuit 300.

Figure 2A:
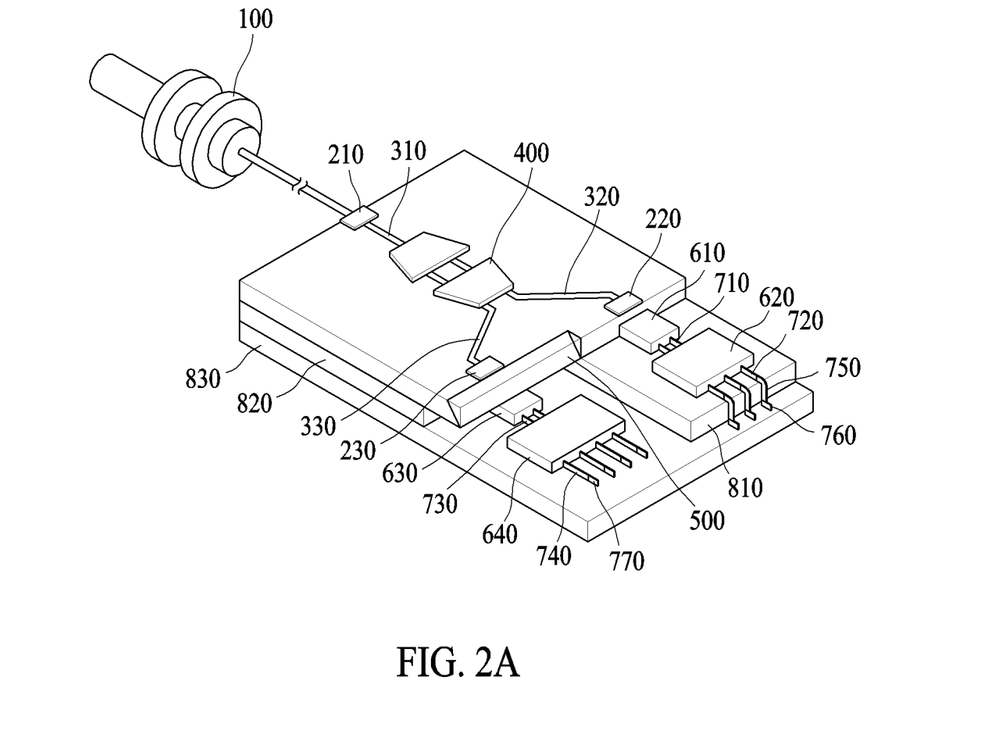
FIG. 2A is a perspective view illustrating the optical transceiver shown in FIG. 1.
Figure 2B:
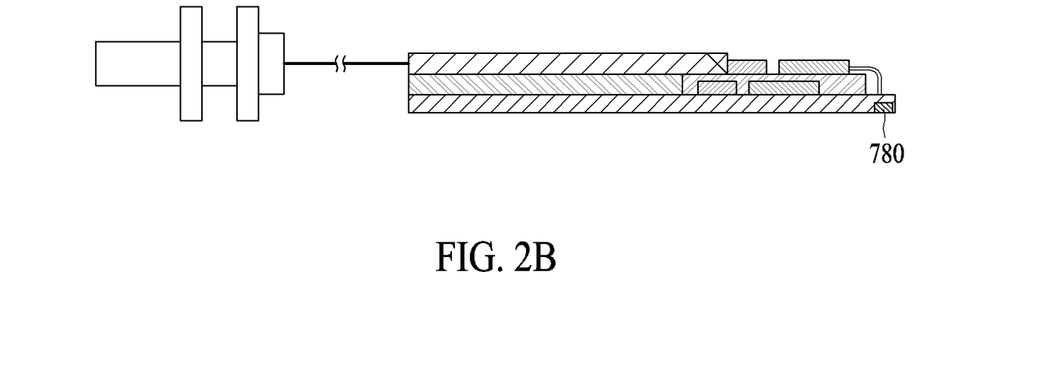
FIG. 2B is a side view illustrating the optical transceiver shown in FIG. 2A.

FIG. 2A is a perspective view illustrating the optical transceiver shown in FIG. 1 and FIG. 2B is a side view illustrating the optical transceiver shown in FIG. 2A.

Referring to FIGS. 2A and 2B, the optical transceiver 10 may include the optical receptacle 100 configured to input or output an optical signal, a first planar lightwave circuit 310 through which the optical signal travels, the arrayed waveguide grating 400 connected to the first planar lightwave circuit 310, and a first spot size converter 210 connecting the optical receptacle 100 and the first planar lightwave circuit 310.

A diameter of a core of an optical fiber installed to the optical receptacle 100 may be approximately 8 to 10 μm, and a width of the first planar lightwave circuit 310 may be approximately 4 to 6 μm. The first spot size converter 210 may enhance an optical coupling between the optical receptacle 100 and the first planar lightwave circuit 310.

The arrayed waveguide grating 400 may split an upstream optical signal and a downstream optical signal or combine the upstream optical signal with the downstream optical signal.

The first planar lightwave circuit 310, the arrayed waveguide grating 400, and the first spot size converter 210 may be formed on a single chip. The optical transceiver 10 may further include a mirror 500 configured to change a path of an optical output of the arrayed waveguide grating 400. For example, the mirror 500 may be a 45-degree mirror, and the 45-degree mirror may change a path of an optical signal by 90 degrees.

The optical transceiver 10 may further include a second planar lightwave circuit 320 connected to the arrayed waveguide grating 400. The optical transceiver 10 may further include a second spot size converter 220 connected to the second planar lightwave circuit 320.

The optical transceiver 10 may further include a laser diode 610 connected to the second spot size converter 220 and a laser diode driver 620. The laser diode driver 620 may be connected to a high-speed wire bonding (WB) 750 or a high-speed signal pad 760 by a high-speed signal line 720.

The high-speed signal line 720 may be a high-speed electrical signal interface between the laser diode driver 620 and the high-speed WB 750 or the laser diode driver 620 and the high-speed signal pad 760.

The second spot size converter 220 may connect the laser diode 610 and the second planar lightwave circuit 320. The laser diode 610 and the laser diode driver 620 may be connected by a high-speed signal line 710. The high-speed signal line 710 may be a high-speed electrical signal interface between the laser diode 610 and the laser diode driver 620.

The second spot size converter 220 may enhance an optical coupling between the second planar lightwave circuit 320 and the laser diode 610.

The optical transceiver 10 may further include a first mount 810 placed under the laser diode 610 and the laser diode driver 620. The first mount 810 may be formed of silicon dioxide ($SiO_2$) and silicon nitride ($Si_3N_4$).

The first mount 810 may adjust a difference between a height of the second spot size converter 220 and a height of the laser diode 610 and the laser diode driver 620. The first mount 810 may emit heat generated from the laser diode 610 and the laser diode driver 620 to outside.

The optical transceiver 10 may further include a third planar lightwave circuit 330 connected to the arrayed waveguide grating 400. The optical transceiver 10 may further include a photodiode 630 connected to the third planar lightwave circuit 330 and a trans-impedance amplifier (TIA) 640 connected to the photodiode 630.

The optical transceiver 10 may further include a third spot size converter 230 connecting the third planar lightwave circuit 330 and the photodiode 630. The photodiode 630 and the TIA 640 may be connected by a high-speed signal line 730. The high-speed signal line 730 may be a high-speed electrical signal interface between the photodiode 630 and the TIA 640.

The third spot size converter 230 may enhance an optical coupling between the third planar lightwave circuit 330 and the mirror 500 or the photodiode 630.

The optical transceiver 10 may further include a second mount 820 placed under the first planar lightwave circuit 310, the arrayed waveguide grating 400 and the first spot size converter 210. The second mount 820 may prevent an optical characteristics variation by a thermal expansion or a thermal contraction of the single chip on which the first spot size converter 210, the second spot size converter 220, the first planar lightwave circuit 310, the second planar lightwave circuit 320, and the arrayed waveguide grating 400 are formed.

The optical characteristics variation may include a peak wavelength change within the arrayed waveguide grating 400 and a radio wave transformation of an optical signal due to a transformation of a lightwave circuit of the first spot size converter 210, the second spot size converter 220, the first planar lightwave circuit 310, the second planar lightwave circuit 320, and the arrayed waveguide grating 400.

The optical transceiver 10 may further include a third mount 830 placed under the second mount 820. A high-speed signal line formed of titanium (Ti), platinum (Pt), and aurum or gold (Au) may be formed on a portion of the third mount 830. For example, a metal plate may be formed of Ti, Pt and Au on the third mount 830 and may be used as a high-speed signal line. A high-speed signal pad including gold-tin (AuSn) may be formed on a portion of the third mount 830. For example, the high-speed signal pad 760 and a high-speed signal pad 780 may be formed by appositionally growing AuSn.

The third mount 830 may support an overall operation of high-density bidirectional optical transmission and reception and may perform an overall heat transfer function and a high-speed signal line function. In other words, the plurality of mounts 810 to 830 may perform a heat transfer function, heat expansion, heat contraction, and a high-speed signal line function and may be formed of a silicon-based material. For example, the plurality of mounts 810 to 830 may be formed of silicon dioxide ($SiO_2$) and silicon nitride ($Si_3N_4$).

The optical transceiver 10 may achieve high-density, integration, and high-speed using the plurality of mounts 810 to 830.

The TIA 640 may be connected to a high-speed signal pad 770 through a high-speed signal line 740. The high-speed signal pad 770 may be connected to the high-speed signal pad 780 placed under the third mount 830. The high-speed signal line 740 may be a high-speed electrical signal interface between the TIA 640 and the high-speed signal pad 770.

The high-speed signal line 710 and the high-speed signal line 720 may be connected to the high-speed signal pad 780 respectively. The high-speed signal pad 780 may serve as an electrical signal interface at an outermost portion of the optical transceiver 10.

The optical configuration for high-density bidirectional optical transmission and reception may include the optical receptacle as an optical input and an optical output.

In the example of FIG. 2A, the plurality of spot size converter 210, 220, and 230, the plurality of planar lightwave circuit 310, 320, and 330, and the arrayed waveguide grating 400 may be formed by a single chip process. After the single chip process, the mirror 500 may be separately manufactured and coupled to a formed chip.

Figure 3A:
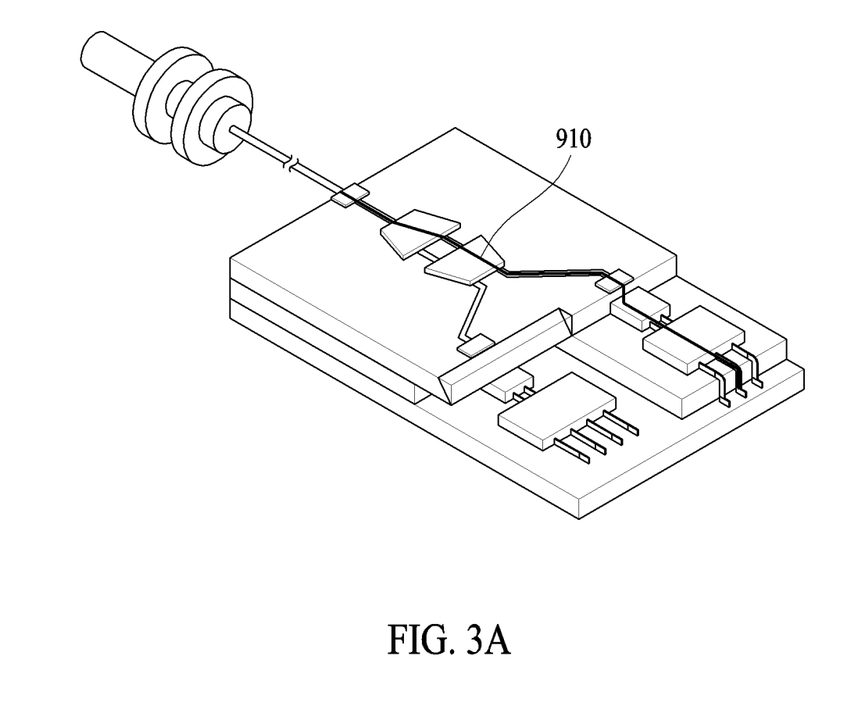
FIG. 3A is a perspective view illustrating a flow of a transmission signal in the optical transceiver shown in FIG. 1.
Figure 3B:
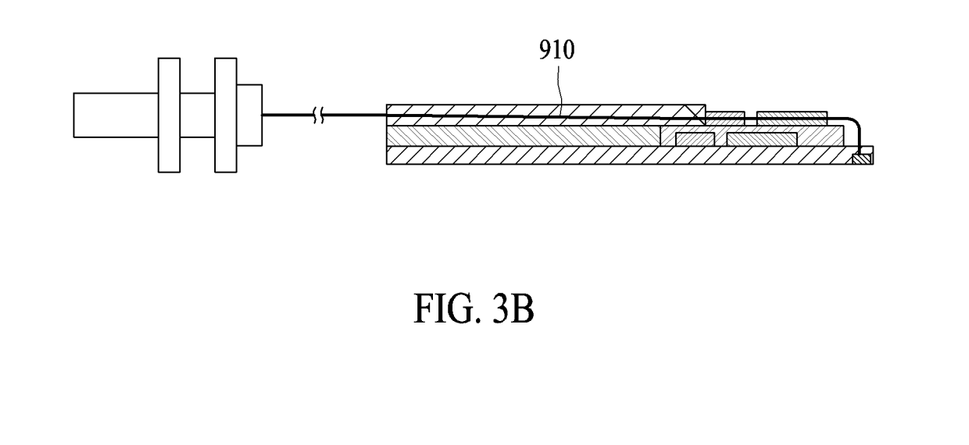
FIG. 3B is a side view of FIG. 3A.
Figure 4A:
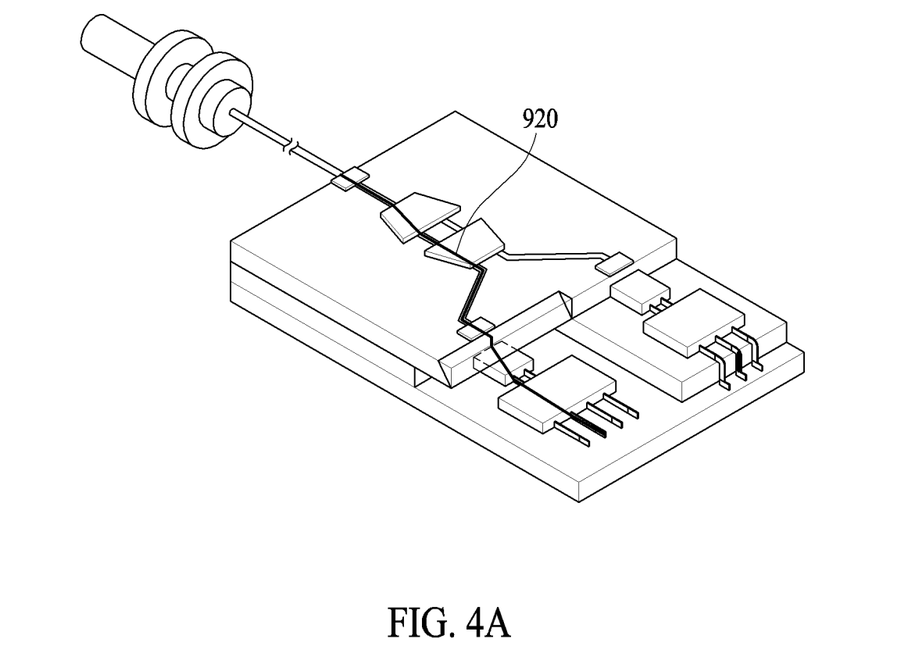
FIG. 4A is a perspective view illustrating a flow of a reception signal in the optical transceiver shown in FIG. 1.
Figure 4B:
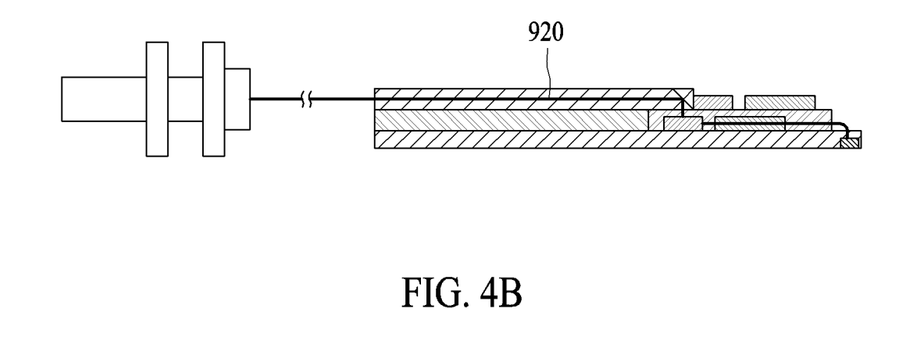
FIG. 4B is a side view of FIG. 4A.

FIG. 3A is a perspective view illustrating a flow of a transmission signal in the optical transceiver shown in FIG. 1 and FIG. 3B is a side view of FIG. 3A. FIG. 4A is a perspective view illustrating a flow of a reception signal in the optical transceiver shown in FIG. 1 and FIG. 4B is a side view of FIG. 4A.

Referring to FIGS. 3A to 4B, the optical transceiver 10 may include a transmission path 910 of an optical signal and a reception path 920 of an optical signal.

In the transmission path 910, an optical signal may be input to the laser diode 610 through the optical receptacle 100, the first spot size converter 210, the first planar lightwave circuit 310, the arrayed waveguide grating 400, the second planar lightwave circuit 320, and the second spot size converter 220.

The optical signal input to the laser diode 610 may be converted to an electrical signal and transmitted to the high-speed signal pad 760 through the high-speed signal line 710, the laser diode driver 620, and the high-speed signal line 720.

In the reception path 920, an optical signal may be input to the photodiode 630 through the optical receptacle 100, the first spot size converter 210, the first planar lightwave circuit 310, the arrayed waveguide grating 400, the second planar lightwave circuit 320, the second spot size converter 220 and the mirror 500.

The optical signal input to the photodiode 630 may be converted to an electrical signal and transmitted to the high-speed signal pad 770 through the high-speed signal line 730, the TIA 640, and the high-speed signal line 740. The high-speed signal pad 770 may be electrically connected to the high-speed signal pad 780.

In the transmission path 910, the electrical signal may be input to the laser diode 610 through the high-speed signal pad 780, the high-speed signal pad 760, the high-speed WB 750, the high-speed signal line 720, the laser diode driver 620 and the high-speed signal line 710.

The electrical signal input to the laser diode 610 may be converted to an optical signal and output to the optical receptacle 100 through the second spot size converter 220, the second planar lightwave circuit 320, the arrayed waveguide grating 400, the first planar lightwave circuit 310, and the first spot size converter 210.

Figures 5A, 5B:
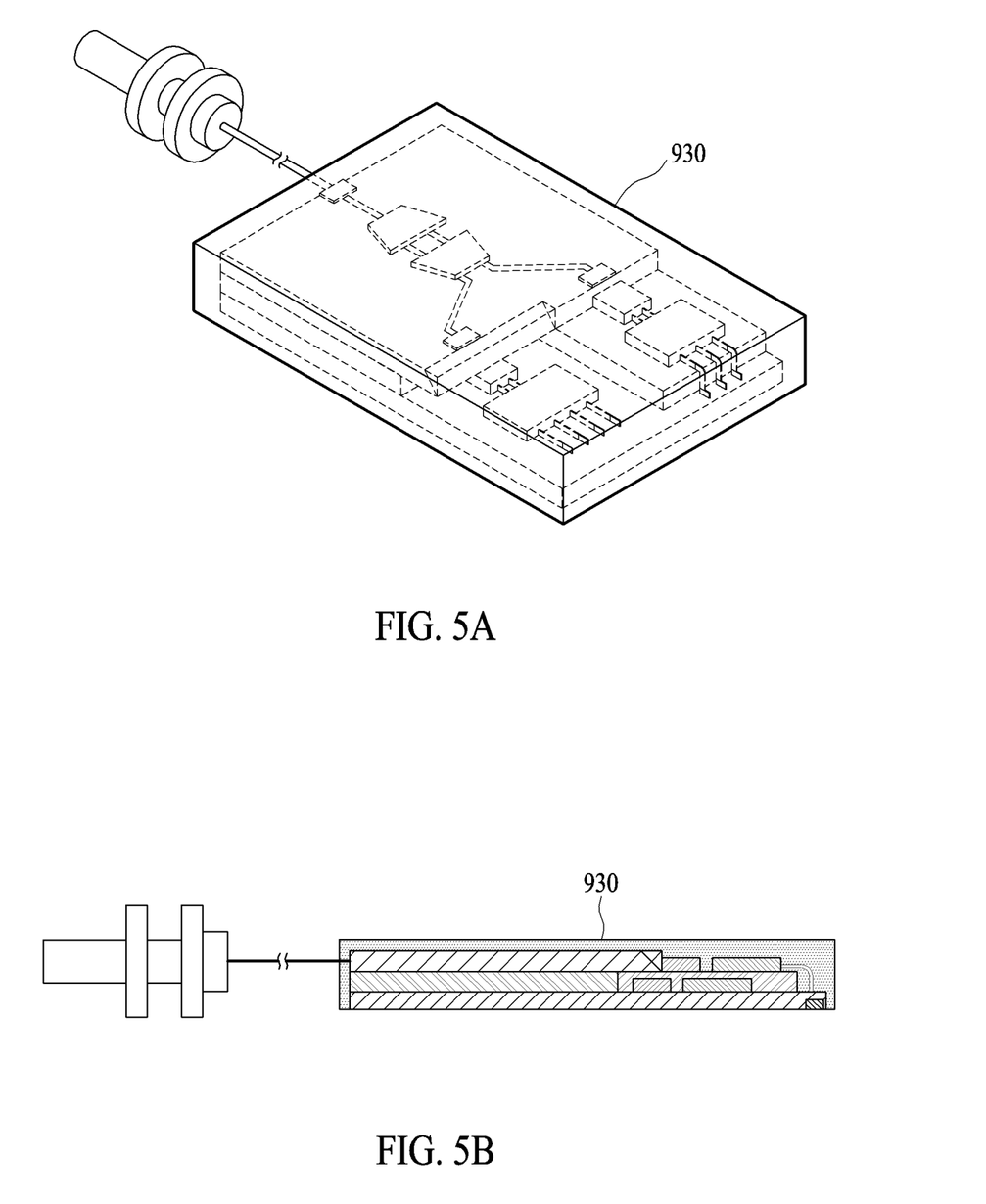
FIG. 5A is a perspective view illustrating an optical transceiver module.
FIG. 5B is a side view of FIG. 5A.
Figure 6:
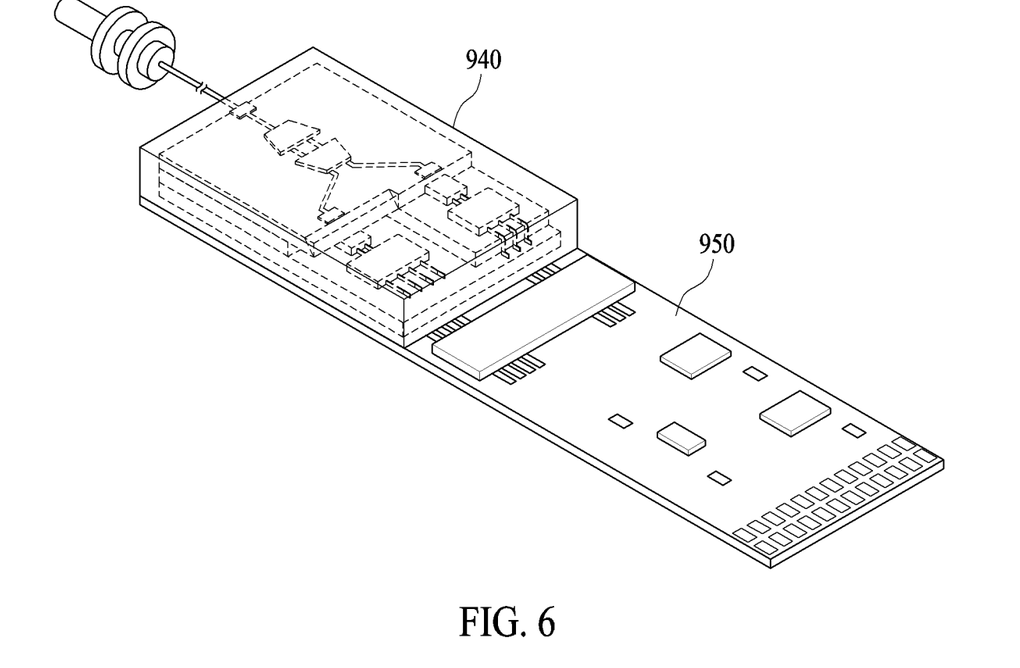
FIG. 6 is a diagram illustrating an optical transceiver module connected to a printed board assembly (PBA)
Figure 7:
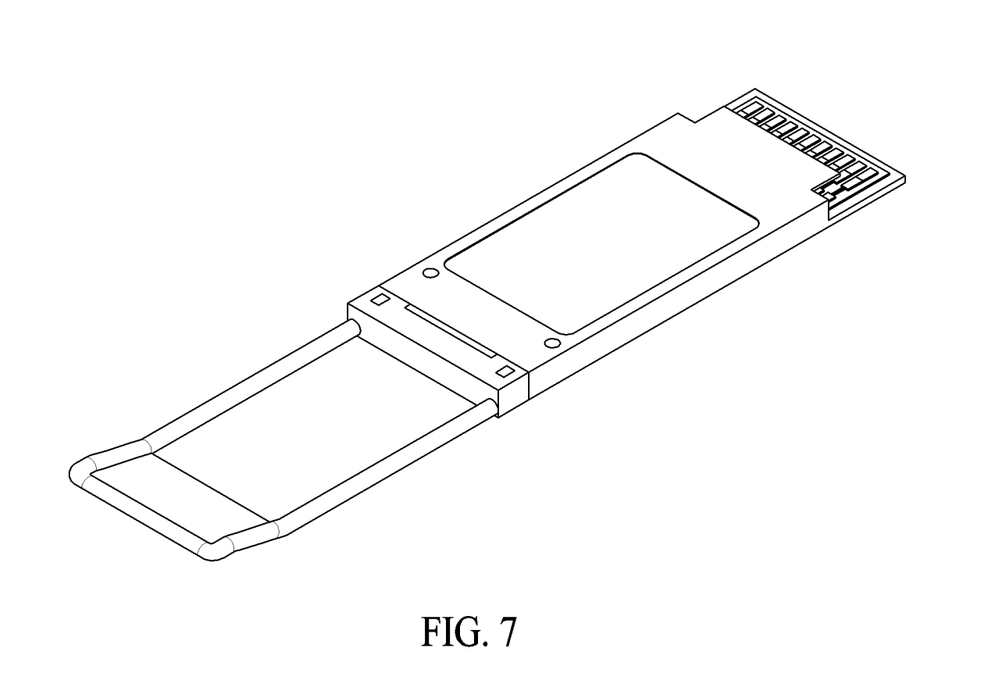
FIG. 7 is a diagram illustrating an optical transceiver device including a structure of FIG. 6.

FIG. 5A is a perspective view illustrating an optical transceiver module and FIG. 5B is a side view of FIG. 5A. FIG. 6 is a diagram illustrating an optical transceiver module connected to a printed board assembly (PBA) and FIG. 7 is a diagram illustrating an optical transceiver device including a structure of FIG. 6.

Referring to FIGS. 5A to 7, FIGS. 5A and 5B represent an example of the optical transceiver 10 which is modularized. The optical transceiver 10 may include an optical transceiver module 940 and a bidirectional optical transceiver printed board assembly (PBA) 950.

An optical transceiver module 930 may include a cover configured to cover the components of FIGS. 2A and 2B. The optical transceiver module 930 may improve a stability of the components of FIGS. 2A and 2B by modularizing. The optical transceiver module 930 may prevent a vibration, a mechanical shock, a thermal shock by modularizing.

In the example of FIG. 6, an optical transceiver module 940 may be connected to a bidirectional optical transceiver PBA 950. The optical transceiver module 940 may be directly connected to the bidirectional optical transceiver PBA 950 through the high-speed signal pad 780 above described.

The optical transceiver 10 may enhance an efficiency of an optical coupling with a photodiode or a laser diode using a spot size converter, a planar lightwave circuit, and a mount and may efficiently emit heat generated from the photodiode and the laser diode.

The optical transceiver 10 may perform optical transmission and optical reception by a wavelength division of an optical signal. By utilizing the above-described structure, the optical transceiver 10 may optimize performance of optical transmission and reception and may maximize performance of optical transmission and reception by achieving high-speed and high-density.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The examples described herein may be implemented using hardware components, software components and/or combinations thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:
1. An optical transceiver comprising:
an optical receptacle configured to input or output an optical signal;
a first planar lightwave circuit through which the optical signal travels;

an arrayed waveguide grating connected to the first planar lightwave circuit;
a first spot size converter connecting the optical receptacle and the first planar lightwave circuit; and
a mirror configured to change a path of an optical output of the arrayed waveguide grating.

2. The optical transceiver of claim 1, wherein the first planar lightwave circuit, the arrayed waveguide grating and the first spot size converter are formed on a single chip.

3. The optical transceiver of claim 1, wherein the mirror is a 45-degree mirror.

4. The optical transceiver of claim 1, further comprising a second planar lightwave circuit connected to the arrayed waveguide grating.

5. The optical transceiver of claim 4, further comprising a second spot size converter connected to the second planar lightwave circuit.

6. The optical transceiver of claim 5, further comprising a laser diode connected to the second spot size converter, and a laser diode driver.

7. The optical transceiver of claim 6, wherein the laser diode driver is connected to a high-speed signal pad by a high-speed signal line.

8. The optical transceiver of claim 6, further comprising a first mount placed under the laser diode and the laser diode driver.

9. The optical transceiver of claim 8, wherein the first mount is formed of silicon dioxide and silicon nitride.

10. The optical transceiver of claim 6, wherein the laser diode and the laser diode driver are connected by a high-speed signal line.

11. The optical transceiver of claim 1, further comprising a third planar lightwave circuit connected to the arrayed waveguide grating.

12. The optical transceiver of claim 11, further comprising:
a photodiode connected to the third planar lightwave circuit; and
a trans-impedance amplifier (TIA) connected to the photodiode.

13. The optical transceiver of claim 12, further comprising a third spot size converter connecting the third planar lightwave circuit and the photodiode.

14. The optical transceiver of claim 12, wherein the photodiode and the TIA are connected by a high-speed signal line.

15. The optical transceiver of claim 1, further comprising a second mount placed under the first planar lightwave circuit, the arrayed waveguide grating and the first spot size converter.

16. The optical transceiver of claim 15, further comprising a third mount placed under the second mount,
wherein a high-speed signal line formed of titanium (Ti), platinum (Pt), and gold (Au) is formed on a portion of the third mount.

17. The optical transceiver of claim 16, wherein a high-speed signal pad comprising gold-tin (AuSn) is formed on a portion of the third mount.

* * * * *